US010214116B2

(12) United States Patent
Gerding et al.

(10) Patent No.: US 10,214,116 B2
(45) Date of Patent: Feb. 26, 2019

(54) OPERATING DEVICE AND MOTOR VEHICLE SEAT

(71) Applicant: Faurecia Autositze GmbH, Stadthagen (DE)

(72) Inventors: Rainer Gerding, Hannover (DE); Bernd Röhrkaste, Hannover (DE)

(73) Assignee: Faurecia Autositze GmbH, Stadthagen (DE)

( * ) Notice: Subject to any disclaimer, the term of this patent is extended or adjusted under 35 U.S.C. 154(b) by 214 days.

(21) Appl. No.: 15/113,218

(22) PCT Filed: Feb. 13, 2015

(86) PCT No.: PCT/EP2015/000313
§ 371 (c)(1),
(2) Date: Jul. 21, 2016

(87) PCT Pub. No.: WO2015/128065
PCT Pub. Date: Sep. 3, 2015

(65) Prior Publication Data
US 2017/0136918 A1    May 18, 2017

(30) Foreign Application Priority Data

Feb. 28, 2014  (DE) .................. 10 2014 002 919

(51) Int. Cl.
| B60N 2/02 | (2006.01) |
| B60N 2/06 | (2006.01) |
| B60N 2/16 | (2006.01) |
| B60N 2/22 | (2006.01) |

(52) U.S. Cl.
CPC .............. *B60N 2/0228* (2013.01); *B60N 2/06* (2013.01); *B60N 2/16* (2013.01); *B60N 2/22* (2013.01)

(58) Field of Classification Search
CPC ..................................................... B60N 2/0228
See application file for complete search history.

(56) References Cited

U.S. PATENT DOCUMENTS

| 5,384,440 | A | * | 1/1995 | Wnuk | .................. | B60N 2/0228 |
| | | | | | | 200/18 |
| 5,668,357 | A | * | 9/1997 | Takiguchi | ............ | B60N 2/0228 |
| | | | | | | 200/302.1 |
| 6,894,234 | B1 | * | 5/2005 | Sottong | ................ | B60N 2/0228 |
| | | | | | | 200/17 R |

(Continued)

FOREIGN PATENT DOCUMENTS

| DE | 2 60102119 T2 | 7/2004 |
| DE | 3 102006013044 A1 | 10/2007 |

(Continued)

OTHER PUBLICATIONS

WIPO, International Search Report (on parent application), dated Apr. 24, 2015.

*Primary Examiner* — Timothy J Brindley
(74) *Attorney, Agent, or Firm* — Laurence P. Colton; Smith Tempel Blaha LLC

(57) ABSTRACT

A control device (1), in particular for car seats (7), with at least one touch-sensitive surface (2). This is designed to generate a control signal for controlling a function, in particular a car seat function, when touched by the hand of an operator. The control device (1) has at least one recess (3) within which the touch-sensitive surface (2) is positioned.

10 Claims, 6 Drawing Sheets

(56) References Cited

U.S. PATENT DOCUMENTS

| | | | | |
|---|---|---|---|---|
| 2006/0061315 A1* | 3/2006 | Schmidt | B60N 2/0228 | 318/568.1 |
| 2006/0279554 A1* | 12/2006 | Shin | G06F 3/03547 | 345/173 |
| 2007/0235297 A1* | 10/2007 | Stoschek | B60N 2/0228 | 200/5 R |
| 2007/0241707 A1* | 10/2007 | Greene | B60N 2/0228 | 318/466 |
| 2009/0050220 A1* | 2/2009 | Kang | B60N 2/502 | 137/625.44 |
| 2010/0176632 A1* | 7/2010 | Alford | B60N 2/0228 | 297/217.3 |
| 2010/0193340 A1* | 8/2010 | Ujimoto | B60N 2/0228 | 200/339 |
| 2010/0264006 A1* | 10/2010 | Salagean | B60N 2/0228 | 200/5 A |
| 2010/0318266 A1* | 12/2010 | Schaaf | B60K 35/00 | 701/49 |
| 2011/0060506 A1* | 3/2011 | Harden | B60N 2/0228 | 701/49 |
| 2015/0251573 A1* | 9/2015 | Misch | B60N 2/665 | 297/452.41 |
| 2015/0321587 A1* | 11/2015 | Shigematsu | B60N 2/995 | 297/330 |
| 2016/0193976 A1* | 7/2016 | Wild | B60N 2/0228 | 701/36 |
| 2016/0280097 A1* | 9/2016 | Hotary | B60N 2/0244 | |
| 2017/0015217 A1* | 1/2017 | Pike | B60N 2/0228 | |
| 2017/0028943 A1* | 2/2017 | Nakagawa | B60N 2/90 | |
| 2017/0158088 A1* | 6/2017 | Pike | B60N 2/0244 | |
| 2017/0282756 A1* | 10/2017 | Bonk | B60N 2/0244 | |

FOREIGN PATENT DOCUMENTS

| | | |
|---|---|---|
| FR | 2825832 A1 | 12/2002 |
| JP | 2003312373 A | 11/2003 |
| JP | 2010001040 A | 1/2010 |

* cited by examiner

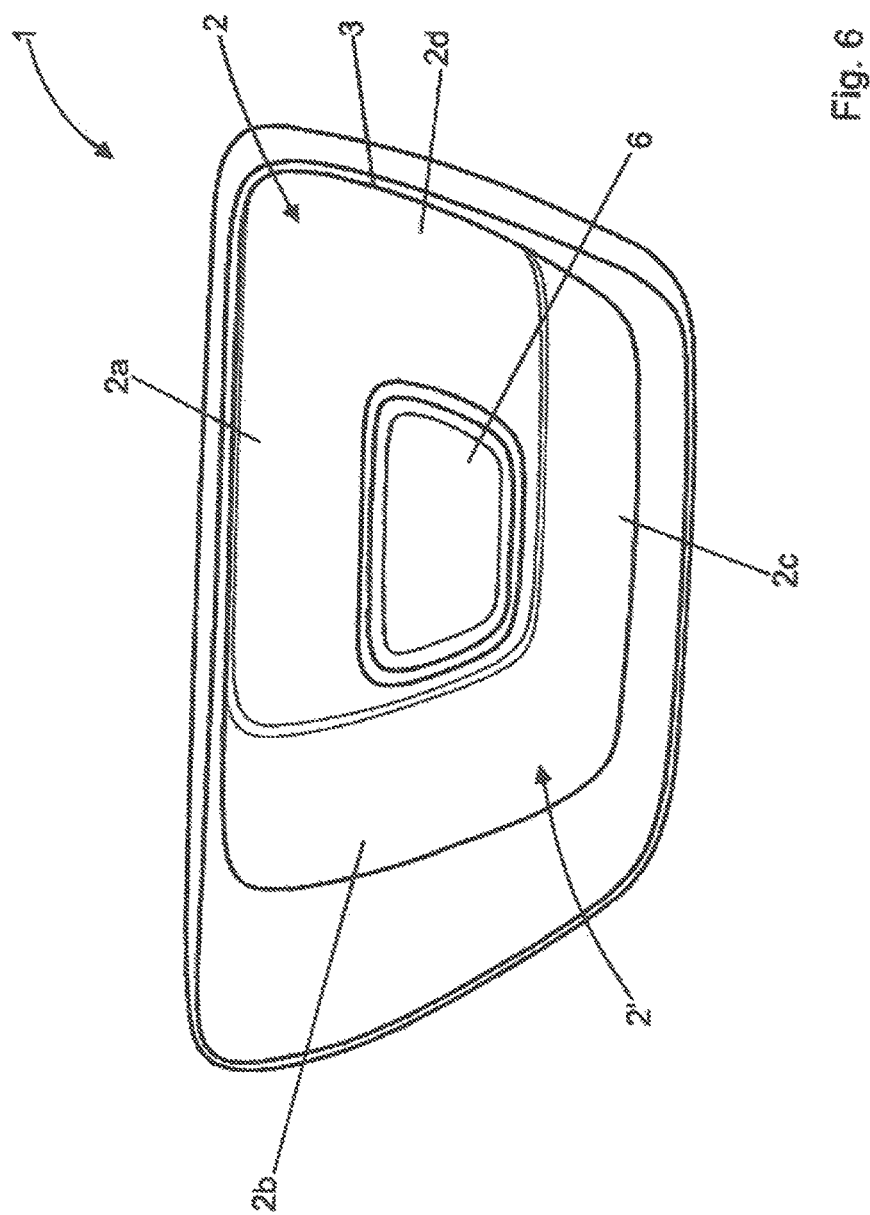

OPERATING DEVICE AND MOTOR VEHICLE SEAT

STATEMENT OF RELATED APPLICATIONS

The application is the US National Phase of International Application No. PCT/EP2015/000313 having an International Filing Date of 13 Feb. 2015, which claims priority on German Patent Application No. 10 2014 002 919.0 having a filing date of 28 Feb. 2014.

BACKGROUND OF THE INVENTION

Technical Field

The invention concerns a control device, in particular for car seats, with at least one touch-sensitive surface designed to generate a control signal for controlling a function, in particular a car seat function, when touched by the hand of an operator, wherein the control device has at least one recess within which the touch-sensitive surface (2) is positioned, characterized in that the recess is designed as a groove or slot to accommodate the operator's fingers, and a motor vehicle seat equipped with such a control device, having a seat section and a back rest as well as the control device.

Prior Art

For some time, it has been common to design switches for adjusting devices—such as the air conditioning or heating in a motor vehicle, for example—as touch-sensitive surfaces, for example from FR 2825832. These touch-sensitive surfaces can be operated very easily using a finger and adjustments can be made steplessly and relatively intuitively since the movement of the operator's finger is converted more or less directly into the adjustment of the setting. A quick movement can therefore make a quick adjustment or a slow movement can make a gradual adjustment.

A touch-sensitive surface for the regulation of a seat heater is also known from JP 2010201040. This is positioned in the side area of the seat section and can be operated with the palm.

The problem with touch-sensitive surfaces is that they are relatively hard to find outside the operator's field of view and this can lead to operator errors. For this reason, such touch-sensitive surfaces outside the operator's field of view are not recommended, particularly if operation is to be possible while driving the vehicle. Possible operator errors may have unforeseen consequences.

BRIEF SUMMARY OF THE INVENTION

The purpose of the invention is therefore to refine a control device of the type specified at the beginning such that the drawbacks mentioned do not occur and, in particular, in order to allow for the use of touch-sensitive surfaces, and in particular vehicle seat adjustors, even outside the operator's field of view.

This problem is solved using a control device, in particular for car seats, with at least one touch-sensitive surface designed to generate a control signal for controlling a function, in particular a car seat function, when touched by the hand of an operator, wherein the control device has at least one recess within which the touch-sensitive surface is positioned, characterized in that the recess is designed as a groove or slot to accommodate the operator's fingers, as well as a motor vehicle seat equipped with this control device, characterized in that the design includes an area which is raised in comparison to the recess, which likewise has at least one touch-sensitive surface.

Favorable designs can be found in the respective sub-claims.

The control device according to the invention has at least one recess, within which the touch-sensitive surface is located. In this manner, it is possible for an operator to feel the touch-sensitive surface which is designed to generate a control signal to control a device—e.g. a car seat function—when touched even when it is outside their field of view and to be guided by in the adjustment of the desired function. This is done through the recess, which can be designed as a groove or slot and which preferably has a particularly ergonomic U-shaped, V-shaped or L-shaped cross section, which accommodates the operator's finger. In this manner, the control device according to the invention is easy for the operator to feel on the one hand and reliably prevents the operator's finger from slipping and therefore prevents unintentional adjustments from being made on the other. Provision may likewise be made for one of the edges, the inner or outer edge of the recess (in relation to the bottom or deepest point of the recess) being higher than the other edge defining the recess. This can allow for spatial orientation on the control device according to the invention since the operator can feel, at all points on the control device, where they are and thus which adjustment options can be touched. In this case, the finger does not therefore need to touch any other points or surfaces in order for the operator to orient themselves.

If the finger is lifted off the control device than provision can be made for automatic stopping of the adjustment. For operation, provision can be made for operation of a control to only be triggered if the finger has covered a minimum distance on the touch-sensitive surface, for example 1 to 4 cm. This can be used to prevent just a short, unintentional touch on a touch-sensitive surface from unintentionally triggering the function if, for example, the operator is feeling for the correct function.

The course of the recess can be in a multitude of different geometrical forms, such as an L-shape or a U-shape or an I-shape or other shapes. The control device according to the invention can also have a plurality of discontinuous recesses which can all be allocated to different functions. A design in which the recess runs around a central section of the control device is preferred. If it surrounds the central section fully then the recess and thus the touch-sensitive surface positioned within it form a closed area. Above all, this offers better operational reliability since the finger is prevented from slipping or from leaving the recess on one side.

Along with the recess, the design can include an area which is raised in comparison with the recess which, for its part, has at least one, or preferably two, touch-sensitive surface(s). In principle, this touch-sensitive surface positioned in the raised area can have the same functions as discussed above or below in connection with the touch-sensitive surfaces positioned in the recess. Consequently, all variations in this application apply equally for both types of touch-sensitive surfaces. If recessed and raised touch-sensitive surfaces are alternated then the operator can recognize by touch alone, without looking, that they are changing from one function to another.

A preferred embodiment has a substantially L-shaped flow of the recess along its length. This can then be designed, for example, so that there is an area which is raised in comparison with the recess which likewise has at least one touch-sensitive surface. The raised area can also have a substantially L-shaped design along its length. Furthermore, the two L-shapes can be arranged so that the substantially L-shaped raised area and the substantially L-shaped recess complete each other to form a substantially rectangular shape. In this manner, a simple geometric shape is created in which it is easy for the operator to orient themselves since they can recognize by touch alone where they are on the control device.

Of course, the raised areas and the recessed areas can also alternate so that, for example, there is a rectangular arrangement in which the raised areas with their touch-sensitive surfaces run roughly horizontally for the majority of their length and the recessed areas with their touch-sensitive surfaces run roughly vertically for the majority of their length.

The recess can also have different shapes. Preferably, its length describes substantially a rectangle. In this manner, there can be a touch sensitive surface in the recess along each side of the rectangle so that touching each side can control a different function. With this configuration, it is particularly easy for the operator to select the right function by feeling the appropriate side of the rectangle. The same applies for other geometric shapes. Round shapes such as circles or ellipses or other polygons such as triangles can therefore also be used as a shape for the recess.

As well as a seat section and a back rest, the motor vehicle seat according to the invention also has a control device as described above. Provision is preferably made here for the control device to be positioned on the seat section on its side section running in the direction of travel. In this manner, adjustments can be made for the ergonomic arm position in the motor vehicle seat using the touch-sensitive surface of the control device.

Provision is preferably made for the motor vehicle seat to have seat adjustment with seat forward-backward adjustment and/or back rest angle adjustment and/or seat height adjustment and/or seat pivot adjustment. At the same time, the control device is coupled with the seat adjustment for operation of the same via the touch-sensitive surface. This coupling can be done wirelessly or using wires.

BRIEF DESCRIPTION OF THE DRAWINGS

The invention is explained in more detail below by means of the drawings in FIGS. 1 to 4.

FIG. 6 shows the embodiment from FIG. 5 in plan view.

PREFERRED EMBODIMENT OF THE INVENTION

Figure 1:
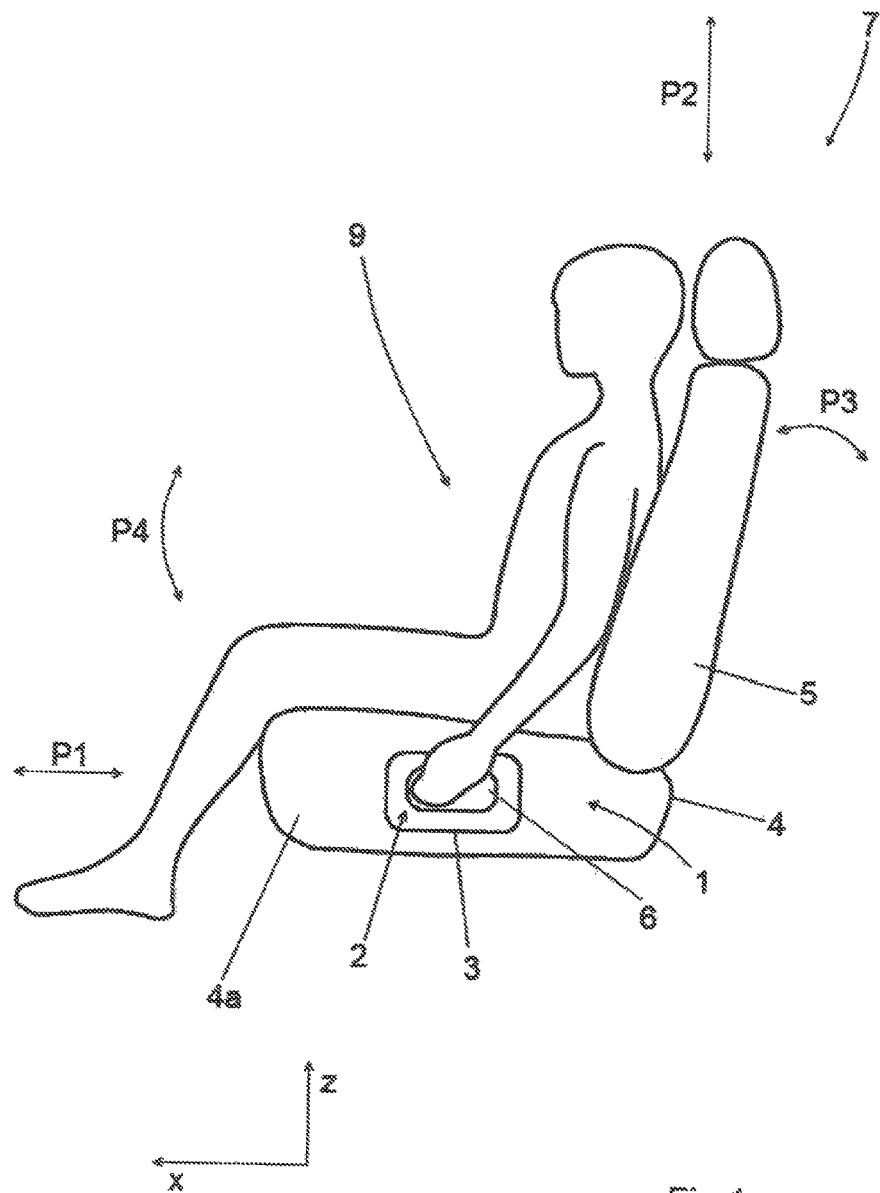
FIG. 1 shows a side view of a motor vehicle seat according to the invention with operator.

The motor vehicle seat 7 shown in FIG. 1 has a seat section 4 and a back rest 5 attached to it in the usual manner. A variety of seat adjustments can be provided for on the seat 7: in particular, a forward-backward seat adjustment indicated by the arrow P1 which can be used to move the seat in the direction of travel X or against the direction of travel X. In addition, there can be a seat height adjustment seat adjustment option which is indicated by the arrow P2 and with which the seat 7 can be raised up or lowered down as a whole in a vertical direction Z. A back rest angle adjustment can also be provided with which the back rest 5 can be tilted in relation to the seat section 4, indicated by the arrow P3. Finally, it is also possible for the seat 7 as a whole to be tilted forwards or backwards using a seat pivot adjustment device as indicated by the arrow P4. All of these and other functions, in particular seat functions such as seat heating or similar, can be operated via a plurality of control devices 1 according to the invention, which are preferably mounted on a side section 4a of the seat section 4 and are thus accessible to an operator 9 with a relaxed arm position by touching the seat section 4a at the side in the direction of travel X.

The function and the design of the control device 1 according to the invention are explained in more detail by means of the following figures.

Figure 2:
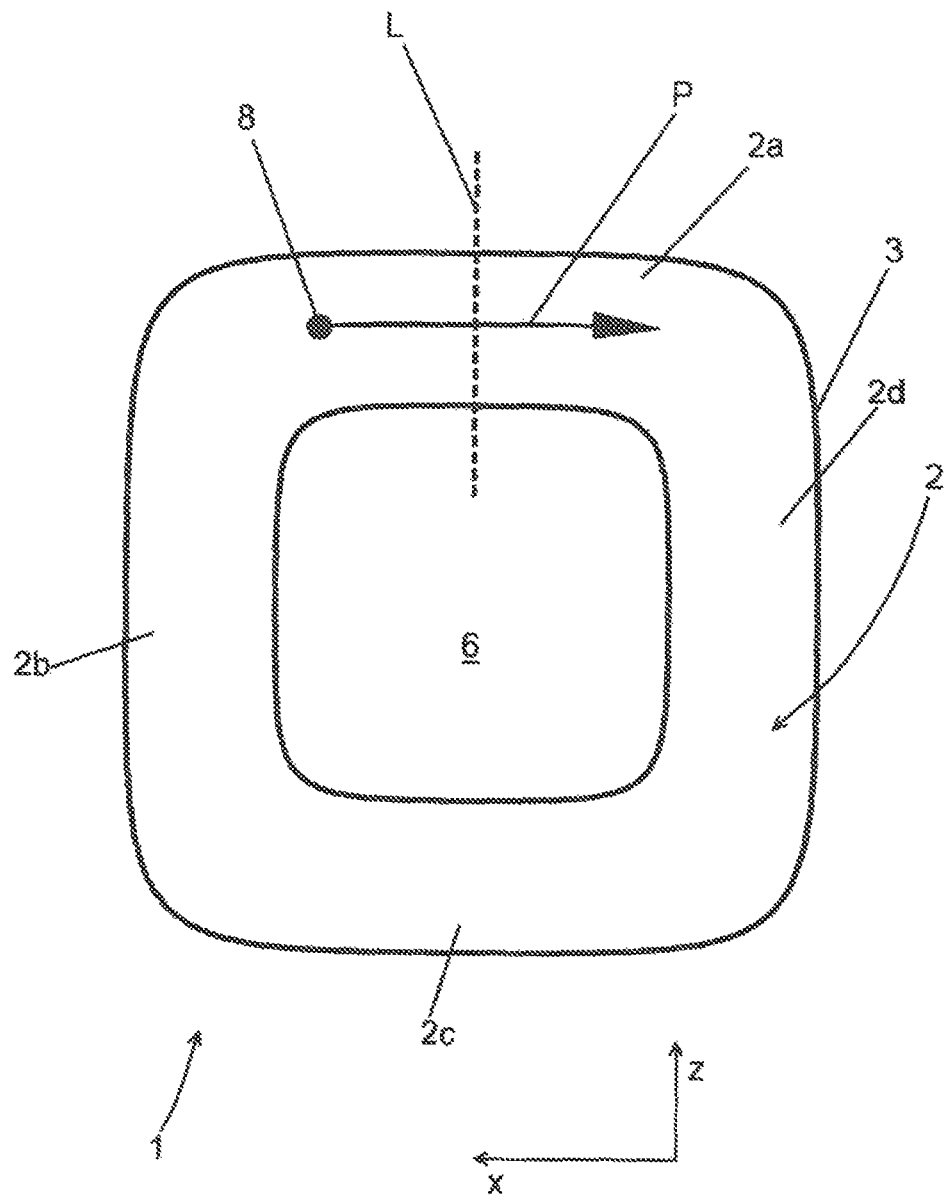
FIG. 2 shows a front view of a control device according to the invention.
Figure 3:
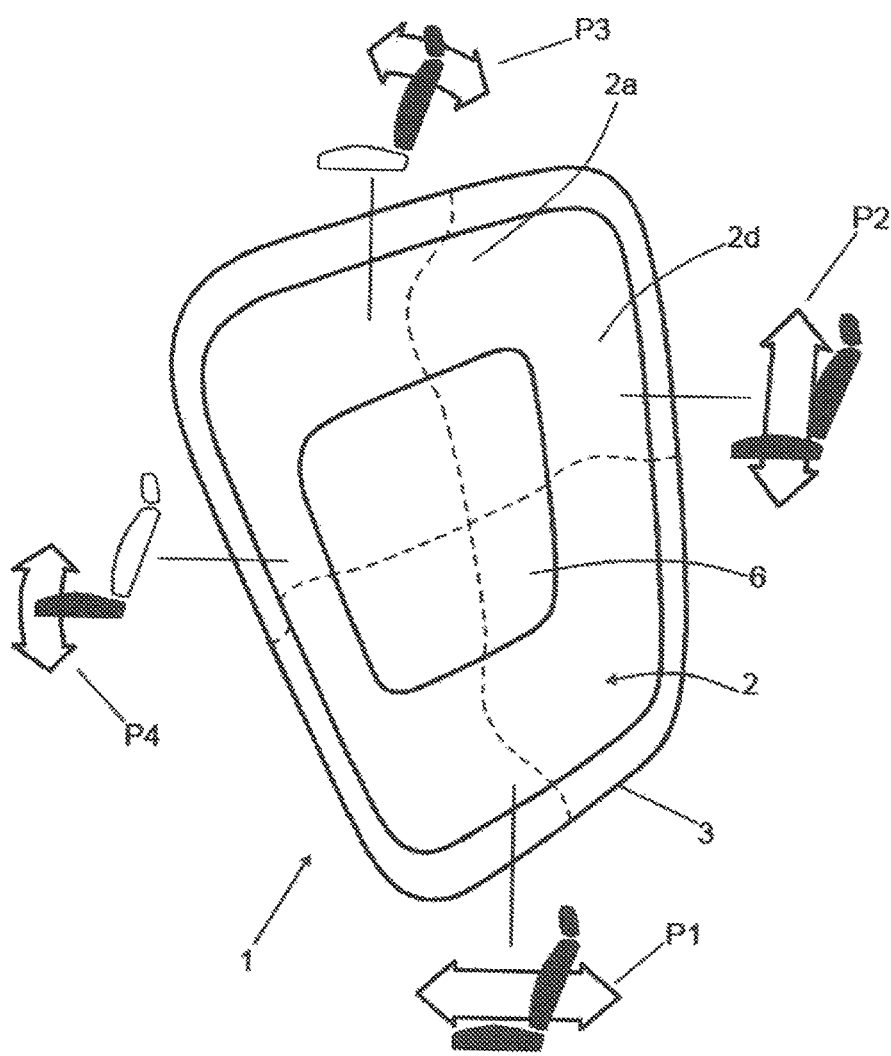
FIG. 3 shows a perspective view of a control device according to the invention with exemplary adjustment options.

As can be seen from FIGS. 2 and 3, the control device has a groove or slot-shaped recess 3 which preferably has a U-shaped, V-shaped or L-shaped cross section. In the example shown, the course of the recess 3 roughly forms a rectangle so that the recess 3 surrounds the central section 6—in particular completely—which is raised in comparison with the recess 3. The central section 6 can be designed as a switch or button in order to carry out likewise varied functions or to switch between various switching levels for the touch-sensitive surfaces 2a, 2b, 2c, 2d. In the recess 3 or in part of the recess 3, there is a touch-sensitive surface (indicated here with 2) through which functions are addressed via the control device 1. This is done by the operator placing their finger in the recess (at point 8, for example) and moving their finger across the touch-sensitive surface 2, for example in the direction of arrow P. Through the movement, for example over a predefined distance (for example from point 8 to line L), the control device generates a signal which indicates the type of position and the range of movement and transmits it to a controller 10 (cf. FIG. 4). The length L which can be freely defined is defined in order to prevent unintentional operator errors (for example, by touching it slightly). The controller (which can be a programmable chip PSoC) processes this signal and transmits it to a device to be operated via an output 12 (in particular a seat adjustment device as described above for FIG. 1) so that this can convert the movement of the operator's finger across the touch-sensitive surface into a corresponding adjustment of the motor vehicle seat. For safety reasons provision can be made so that the adjustment by the controller 10 is stopped as soon as there is no longer contact between the operator's finger and the appropriate touch-sensitive surface.

Exemplary possible seat adjustments are shown in FIG. 3. A movement of the operator's finger along section 2a of the touch-sensitive surface 2 (here the upper side of the rectangle formed by the recess 3) leads, for example, to a back rest angle adjustment of the back rest 5 forwards or backwards depending on the direction of movement of the finger; a movement along section 2b tilts the seat section 4 up or down depending on the direction of movement of the finger. Likewise, a movement of the finger along section 2c leads to a forward-backward adjustment of the seat 7 towards or against the direction of travel depending on the direction of movement of the finger. A movement of the finger along section 2d leads to adjustment of the seat height up or down depending on the direction of movement of the finger.

Figure 4:
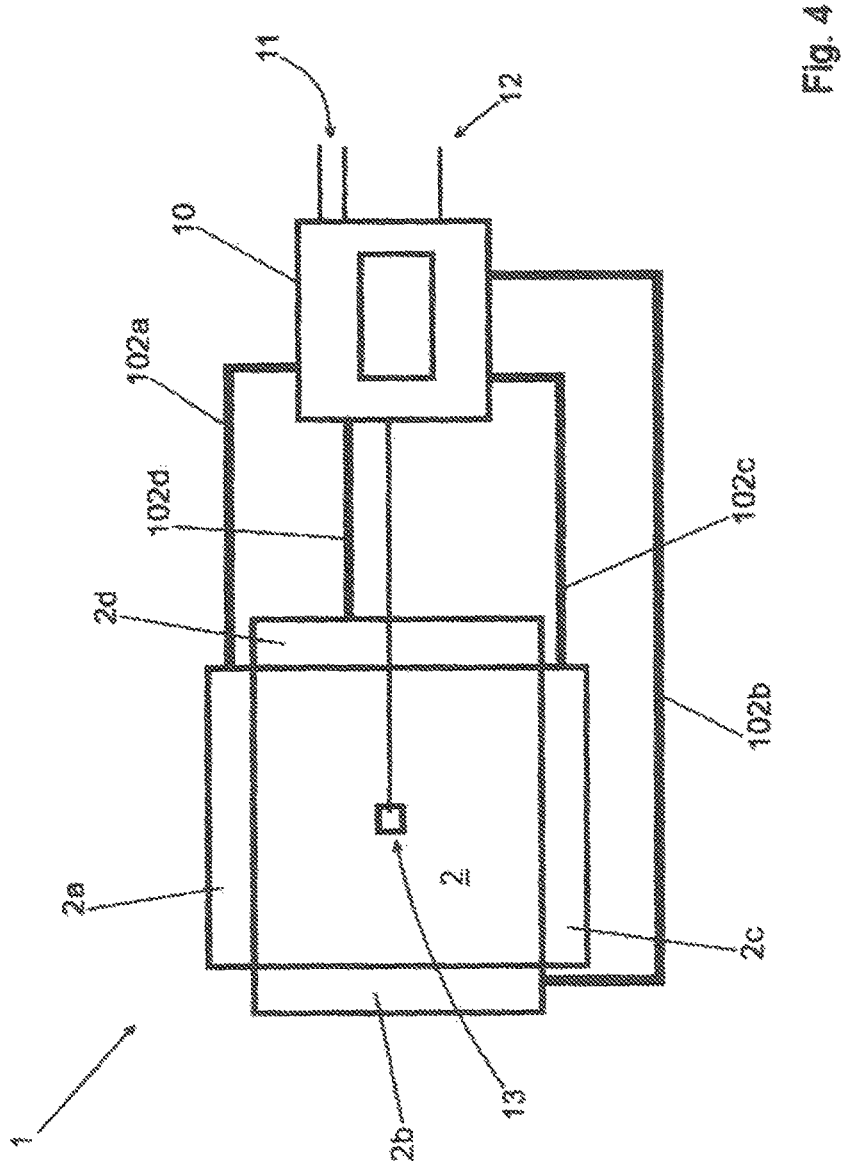
FIG. 4 shows the control device according to the invention in a block diagram.

A possible circuit diagram for the control device is shown in FIG. 4. The controller 10, which transmits the adjustment signals to the appropriate devices in the motor vehicle seat via output 12, is supplied with power via the voltage input 11. The individual sections 2a-2d of the touch-sensitive surface 2 are coupled with the controller 10 via communication connections 102a, 102b, 102c and 102d respectively (wirelessly or with wires) so that contacts with the corresponding sections 2a-2d can be detected by the controller 10 and converted into control signals for the individual seat adjustments. In addition, a switch 13 can be provided in order to be able to switch between different switching levels. Additional functions can thus be provided with the same control device 1 with, for example, the switch 13 making the specified adjustments of forward-backward adjustment, angle adjustment, height adjustment, etc. accessible through contact with the sections 2a-2d in the first switching level. If you switch to a second switching level, then different functions such as comfort settings including lumbar adjustment, seat width adjustment, side bolster adjustment, etc. are allocated to the sections 2a-2d. If you move the switch to a third level, then functions such as massage functions, seat heating, etc. can be allocated to sections 2a-2d. Of course, more or less switching levels are possible. The switch 13 also does not have to sit on the control device, it can also be positioning in another location. This switching has the advantage that, using the software controls, a range of different seat variants with differing scope of operation can be operated using the same control device 1. The manufacturer then only requires one control device.

Figure 5:
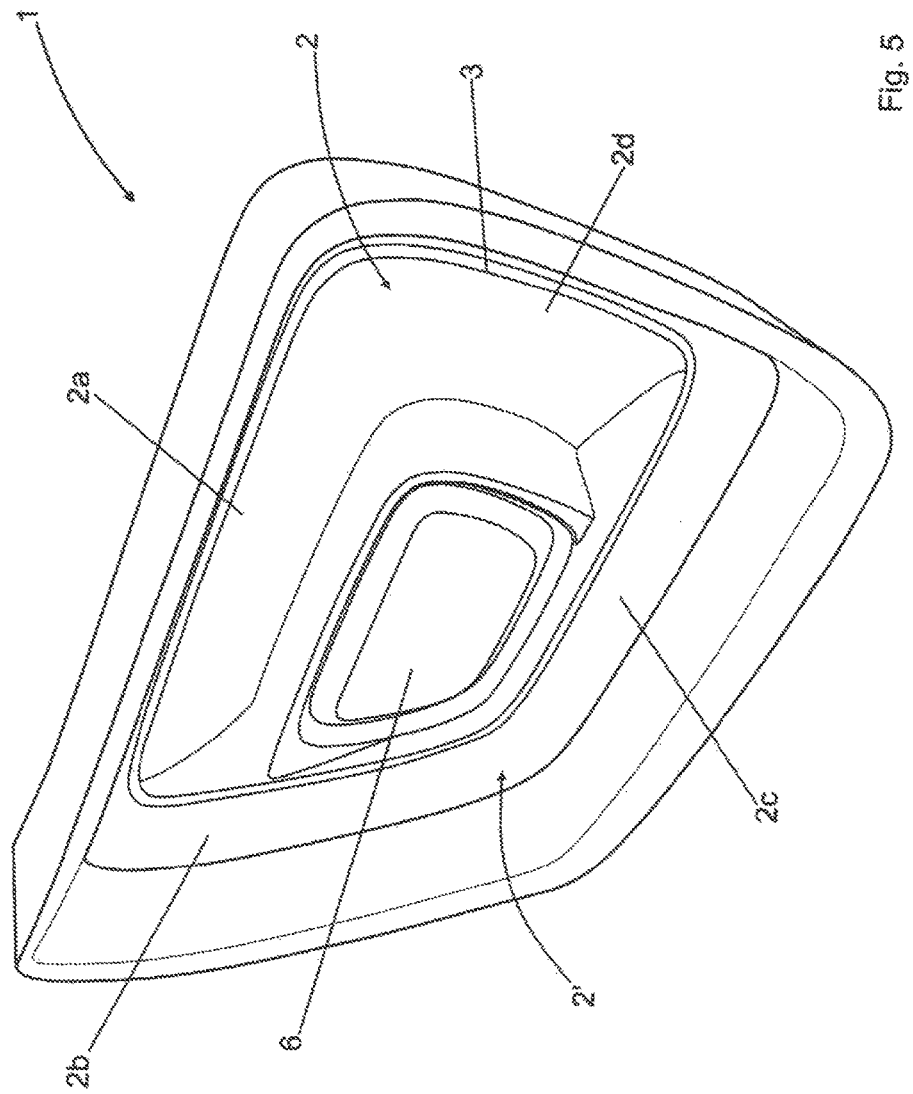
FIG. 5 shows a perspective view of another control device according to the invention in a perspective view.

The embodiment shown in FIGS. 5 and 6 has at least one second touch-sensitive surface 2' which, in the example shown, comprises the areas or sections 2b, 2c in addition to the first recessed touch-sensitive surface 2 located in the recess 3 which, in the example shown, comprises the areas or sections 2a, 2d. With regard to the function assignment for the touch-sensitive surfaces 2a-2d and the raised central section 6 which can be designed as a button or switch, please refer to the designs for FIGS. 1 to 4. In the example shown, the user can feel by touch which function they are operating since they perceive the transition from section 2 to section 2' as a step when feeling. This allows for even more effective prevention of operator errors.

In the example shown, the areas 2 and 2' are both L-shaped and complete one another to form a rectangle. Of course, other configurations are also possible. The touch-sensitive surfaces 2b, 2d could thus be raised and the other surfaces 2a, 2c be recessed or vice versa. A U-shaped, V-shaped or other shape of raised or recessed area is also possible.

The invention claimed is:

1. A control device for a car seat, comprising:
   at least one touch-sensitive surface for generating a control signal for controlling a car seat function when touched by the hand of an operator;
   at least one recess within which the at least one touch-sensitive surface is positioned, wherein the at least one recess is a groove or slot to accommodate an operator's fingers; and
   a switch for switching between a variety of different switching levels, the variety of different switching levels each having different adjustment functions for the car seat.

2. The control device according to claim 1, wherein that the at least one recess runs around a central section of the control device.

3. The control device according to claim 1, wherein the at least one recess has a cross section that is U-shaped, V-shaped, or L-shaped.

4. The control device according to claim 1, wherein the at least one recess has a longitudinal extent, and the longitudinal extent of the at least one recess essentially forms a rectangle.

5. The control device according to claim 1, wherein the at least one recess has a bottom and opposite edges, the opposite edges being of different heights in relation to the bottom of the recess.

6. A motor vehicle seat, comprising:
   a seat section;
   a back rest; and
   a control device,
   wherein the control device comprises:
   a) at least one touch-sensitive surface for generating a control signal for controlling a car seat function when touched by the hand of an operator;
   b) at least one recess within which the at least one touch-sensitive surface is positioned, wherein the at least one recess is a groove or slot to accommodate an operator's fingers; and
   c) a switch for switching between a variety of different switching levels, the variety of different switching levels each having different adjustment functions for the car seat.

7. The motor vehicle seat according to claim 6, wherein the control device is positioned on the seat section on a side section running in a direction of travel (X).

8. The motor vehicle seat according to claim 6, wherein the motor vehicle seat has a means for seat adjustment having at least one of a forward-backward seat adjustment (P1), a back rest angle adjustment (P3), a seat height adjustment (P2), and a seat pivot adjustment (P4), and the control device is coupled with the means for seat adjustment for operation of the means for seat adjustment using the touch-sensitive surface.

9. The motor vehicle seat according to claim 7, wherein the motor vehicle seat has a means for seat adjustment having at least one of a forward-backward seat adjustment (P1), a back rest angle adjustment (P3), a seat height adjustment (P2), and a seat pivot adjustment (P4), and the control device is coupled with the means for seat adjustment for operation of the means for seat adjustment using the touch-sensitive surface.

10. The control device according to claim 1, wherein the at least one recess runs around a central section of the control device and comprises a plurality of discontinuous recesses.

* * * * *